(12) United States Patent
Wang

(10) Patent No.: US 7,940,902 B2
(45) Date of Patent: May 10, 2011

(54) METHOD AND APPARATUS FOR IMPLEMENTING CARD CALL SERVICE

(75) Inventor: Peng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 734 days.

(21) Appl. No.: 11/871,617

(22) Filed: Oct. 12, 2007

(65) Prior Publication Data

US 2008/0260124 A1    Oct. 23, 2008

Related U.S. Application Data

(63) Continuation of application No. PCT/CN2006/000665, filed on Apr. 13, 2006.

(30) Foreign Application Priority Data

Apr. 13, 2005   (CN) .............................. 200510034162

(51) Int. Cl.
*H04M 15/00* (2006.01)
(52) U.S. Cl. ................ 379/114.15; 379/114.2; 235/380; 380/257; 380/259; 380/268
(58) Field of Classification Search .................. 379/111, 379/112.02, 114.01, 114.15, 114.18, 114.19, 379/114.2, 115.01, 121.01, 127.04; 380/26, 380/255, 257, 259, 264, 268; 235/380
See application file for complete search history.

(56) References Cited

U.S. PATENT DOCUMENTS

| 5,754,652 | A | * | 5/1998 | Wilfong ........................ 713/183 |
|---|---|---|---|---|
| 5,864,609 | A | * | 1/1999 | Cross et al. .............. 379/114.13 |
| 5,914,471 | A | * | 6/1999 | Van De Pavert .............. 235/380 |
| 5,940,511 | A | * | 8/1999 | Wilfong ........................ 713/183 |
| 6,226,364 | B1 | * | 5/2001 | O'Neil ........................ 379/114.2 |
| 6,246,757 | B1 | | 6/2001 | Cai et al. |
| 6,438,220 | B1 | | 8/2002 | Liu |
| 6,937,593 | B1 | * | 8/2005 | Gunasekar et al. ........... 370/352 |
| 2001/0055382 | A1 | * | 12/2001 | Oran et al. ..................... 379/229 |
| 2002/0126821 | A1 | * | 9/2002 | Barak et al. ................... 379/219 |
| 2005/0021761 | A1 | | 1/2005 | Thomas |
| 2005/0232173 | A1 | * | 10/2005 | Gunasekar et al. ........... 370/282 |

(Continued)

FOREIGN PATENT DOCUMENTS

CN    1411254 A    4/2003

(Continued)

OTHER PUBLICATIONS

1st Office Action in corresponding Chinese Application No. 2005100341628 (Dec. 28, 2007).

(Continued)

*Primary Examiner* — Binh K Tieu
(74) *Attorney, Agent, or Firm* — Leydig, Voit & Mayer, Ltd.

(57) ABSTRACT

A method and an apparatus for implementing a card call service are disclosed in embodiments of the present invention. The method includes: obtaining card information of a user terminal when determining that a call initiated by the user terminal is a card call; providing a card call service for the user terminal when determining, according to the card information, that the card call is supported. It can be seen that NGN may provide a user terminal with a card call service when the user terminal initiating a card call has the card information which may support a card call, so that the satisfaction of users is remarkably improved.

19 Claims, 3 Drawing Sheets

U.S. PATENT DOCUMENTS

2007/0190972 A1* 8/2007 Cai .............................. 455/406
2008/0253362 A1* 10/2008 Samarasinghe et al. ...... 370/352

FOREIGN PATENT DOCUMENTS

CN 1459969 A 12/2003
WO WO 02/23851 A2 3/2002

OTHER PUBLICATIONS $2^{nd}$ Office Action in corresponding Chinese Application No. 2005100341628 (Mar. 21, 2008).

Rejection Decision in corresponding Chinese Application No. 2005100341628 (Jan. 29, 2010).

Notification of Re-Examination in corresponding Chinese Application No. 2005100341628 (Oct. 29, 2010).

Written Opinion of the International Searching Authority in corresponding PCT Application No. PCT/CN2006/000665 (Aug. 3, 2006).

* cited by examiner

METHOD AND APPARATUS FOR IMPLEMENTING CARD CALL SERVICE

This application is a continuation of International Patent Application No. PCT/CN2006/000665, filed Apr. 13, 2006, which claims priority to Chinese Patent. Application No. 200510034162.8, filed Apr. 13, 2005, both of which are hereby incorporated by reference.

FIELD OF THE INVENTION

The present invention relates to technologies of Next Generation Network (NGN), and particularly, to a method and an apparatus for implementing an anonymous call in NGN.

BACKGROUND OF THE INVENTION

Conventional Public Switched Telephone Network (PSTN) may provide card call services such as phone card 201 and 300 services. Along with the development of telecommunication technologies, it is a trend to merge communication networks including the PSTN with one another, which gives birth to Next Generation Network (NGN). As a service-driven network, NGN may provide a variety of services including intelligent services. A card call service supporting a card call is one of the intelligent services which may be provided by NGN.

The basic principle for implementing a card call service in NGN is shown in FIG. 1. A user employs a calling user terminal registered in NGN to initiate a call request, in order to access a call processing server. The call processing server reads calling information carried in the call request, authenticates the calling user terminal based on the calling information, reads the prefix of the called number carried in the call request if the calling user terminal is valid, determines that the calling user terminal has initiated a card call according to the obtained prefix of the called number, and then forwards the call request to an Intelligent Network (IN) server.

Upon receipt of the call request, the IN server applies for a dedicated media channel via an internal or external Media Resource Server (MRS), and adopts the dedicated media channel to instruct the user via the calling user terminal to input the serial number and password of a card. When the IN server receives the serial number and password of the card with the number receiving function of the MRS, the IN server authenticates the serial number and password of the card and checks whether the deposit corresponding to the serial number and password of the card in a database may support the card call. At least one of the serial number and password of the card and the deposit supporting the card call are named as card information which may support the card call.

Having determined that the serial number and password of the card are correct and the deposit is sufficient to implement a card call, the IN server forwards the call request to the called user terminal. After the called user terminal returns a call response to the IN server indicating that the call is accepted by a called user, the IN server sends a call Acknowledgment (ACK) message to the called user terminal and establishes a media channel which connects the IN server and the called user terminal to enable the calling user terminal and the called user terminal to carry out the subsequent communication.

If a call processing server determines that the calling user terminal is invalid, the call request sent from the calling user terminal is rejected. Specifically, the method of the authentication includes: determining whether the calling information provided by the calling user terminal matches user terminal information which is registered and saved in the database, determining that the calling user terminal is valid if the calling information provided by the calling user terminal matches the user terminal information; otherwise, determining that the calling user terminal is invalid.

It can be seen that NGN may implement the card call service on the premise that the calling user terminal should provide the calling information when initiating a call and pass the authentication, which actually inherits the communication feature of PSTN and brings out a variety of defects into the card call service provided by NGN.

The defects are brought out due to the following reasons. Unlike the twisted pair line access mode used by PSTN, NGN is a communication network based on Internet Protocol (IP). Thus, unlike PSTN which merely provides services for registered user terminals, NGN not only provides services for the registered user terminals but also for a larger number of unregistered user terminals which communicate based on IP. However, calling information provided by the unregistered user terminals when initiating card calls may not match user terminal information registered in the database.

It can be seen that NGN may not provide card call services for a large number of unregistered user terminals which initiate card calls whether the unregistered user terminals have card information which may support the card calls. Practically, if a large number of card call services are rejected, it certainly reduces the satisfaction of users, and holds operators back from promoting the card call services, severely impedes the development of services provided by the operators, and impairs the development of NGN services.

SUMMARY

In view of the above, embodiments of the present invention provide a method and an apparatus for implementing a card call service. As long as a user terminal initiating a card call carries card information which may support the card call, NGN may provide the user with the card call service to improve the satisfaction of the user.

One embodiment of the present invention provides a method for implementing a card call service. The method includes:

obtaining card information of a user terminal when determining that a call initiated by the user terminal is a card call;

providing a card call service for the user terminal when determining that the card call is supported according to the card information.

Another embodiment of the present invention provides an apparatus for implementing a card call service. The apparatus includes:

a call managing unit, configured to receive a call initiated by a user terminal, and send the call to a card call service managing unit when the call is determined to be a card call;

the card call service managing unit, configured to obtain card information of the user terminal and provide a card call service for the user terminal when the card call is determined to be supported according the card information.

It can be seen that the method for implementing a card call service provided by embodiments of the present invention merely concerns about whether a user terminal initiating a card call has card information which may support a card call. As long as the user terminal initiating the card call has the card information which may support the card call, NGN may provide the user terminal with the card call service, so that the satisfaction of the user is observably improved.

Furthermore, the method provided by embodiments of the present invention does not need the MRS to participate in the operation of receiving the serial number and password of a card, which may observably save transporting resources, remarkably raise the speed of implementing a card call, and observably improve the satisfaction of a user.

DETAILED DESCRIPTION OF THE INVENTION

Embodiments are hereinafter described in details with reference to the accompanying drawings to make technical scheme and merits of the present invention more apparent.

The present invention focuses on whether a user terminal initiating a card call has card information, and a card call may be supported with the card information. As long as the user terminal initiating a card call has the card information, NGN may provide a card call service for the user terminal.

Figure 1:
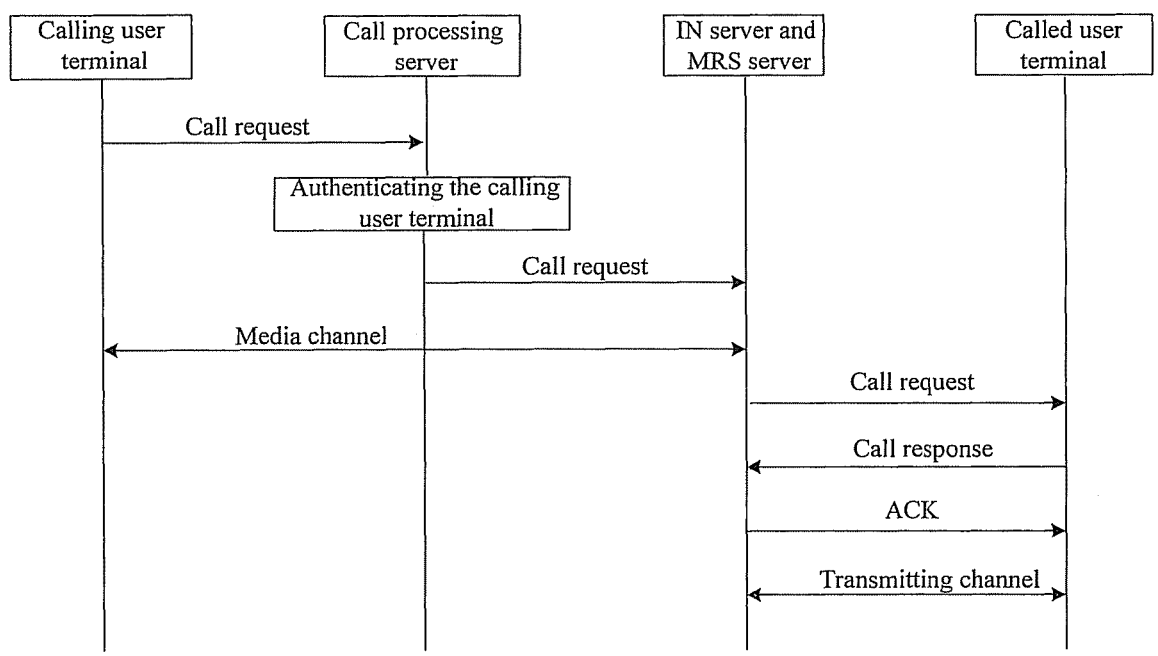
FIG. 1 is a simplified flow chart of a method for implementing a card call service according to a conventional method.
Figure 2:
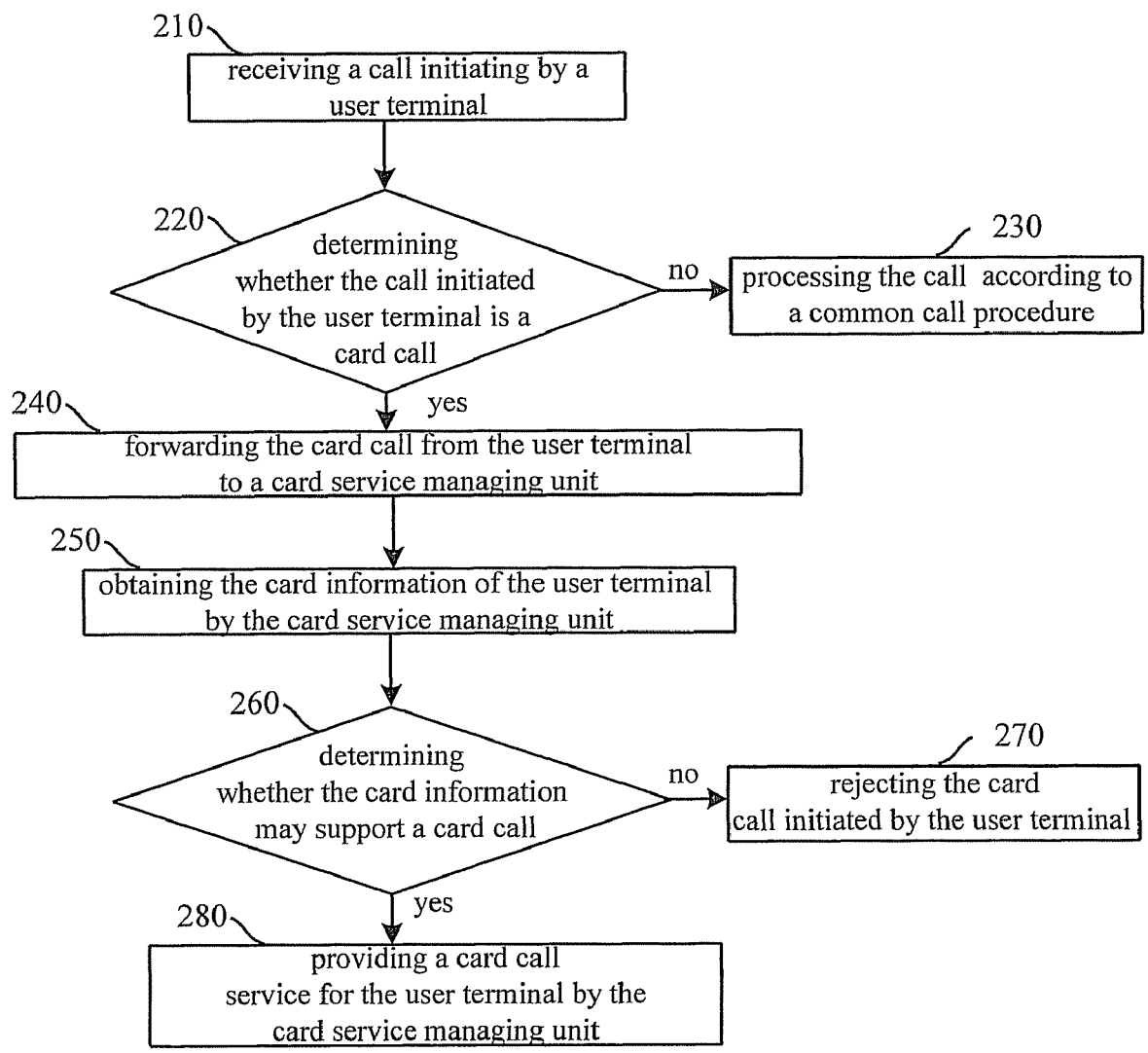
FIG. 2 is a simplified flow chart of a method for implementing a card call service according to an embodiment of the present invention.

The method provided by an embodiment of the present invention for implementing a card call service in NGN is shown in FIG. 2. FIG. 2 is a simplified flow chart of a method for implementing a card call service according to an embodiment of the present invention. The procedure includes the following processes.

Block 210: A user terminal which desires a card call initiates a call to a call managing unit. The call is generally initiated in a form of sending a call request. The user terminal is regarded as a calling user terminal.

Block 220: The call managing unit determines whether the call from the calling user terminal is a card call. If the call from the calling user terminal is a card call, perform Block 240; otherwise, perform Block 230 and terminate the process. There are various methods for determining whether the call is a card call.

Method 1: The call managing unit obtains calling information carried in the call request, determines whether the obtained calling information carries a card call service identifier indicating a card call or whether the obtained calling information is null, and determines that the call initiated by the calling user terminal is a card call if the obtained calling information carries the card call service identifier or the obtained calling information is null; otherwise, determines that the call initiated by the calling user terminal is not a card call.

Method 2: The call managing unit obtains called information carried in the call request, determines whether the obtained called information carries a card call service identifier indicating a card call, and determines that the call initiated by the calling user terminal is a card call if the obtained called information carries the card call service identifier; otherwise determines that the call initiated by the calling user terminal is not a card call.

The card call service identifier may be set in the prefix of the called number carried in the called information.

Method 3: The call managing unit obtains the calling information and the called information carried in the call request, determines whether the obtained calling information is null or whether the obtained calling information carries a card call service identifier indicating a card call, and determines whether the obtained called information carries a card call service identifier indicating a card call. Merely when the calling information is determined to be null or the calling information is determined to carry a card call service identifier and the called information is determined to carry the card call service identifier, the call managing unit determines that the call initiated by the calling user terminal is a card call; otherwise, the call managing unit determines that the call initiated by the calling user terminal is not a card call.

Block 230: The call managing unit processes the call initiated by the calling user terminal with a conventional method. For example, the call managing unit determines that the call is an ordinary call, and then performs a subsequent procedure corresponding to the ordinary call for the calling user terminal.

Block 240: The call managing unit forwards a card call initiated by the calling user terminal to a card service managing unit. Generally, the process includes forwarding, via the call managing unit, the call request sent from the calling user terminal to the card service managing unit.

Block 250: The card service managing unit obtains card information of the calling user terminal after receiving the card call initiated by the calling user terminal.

The card information may be obtained in two ways, one is obtaining the card information in a clear mode and the other is obtaining the card information in an encryption mode.

To be specific, in the case that the card information is obtained in the clear mode, the calling user terminal may send the call request carrying a serial number and password of the card, and the card service managing unit reads the serial number and password of the card carried in the call request and inquires a database for a deposit corresponding to the serial number and password of the card. Practically, the calling user terminal may not send the call request carrying a serial number and password in another embodiment. Then, the card service managing unit may send a card information obtaining command to the calling user terminal, and the calling user terminal sends the serial number and password of the card saved by itself to the card service managing unit upon receiving the card information obtaining command.

In the case that the card information is obtained in the encryption mode, the card service managing unit and the calling user terminal may employ the same encrypting method negotiated in advance, e.g., an HTTP-Digest authentication method, to encrypt or decrypt the communication information.

To be specific, the card service managing unit generates a random number and sends the random number to the calling user terminal. The calling user terminal encrypts the serial number and password of the card saved by itself with the random number sent from the card service managing unit, and sends the encryption message obtained by encrypting and the serial number of the card and the random number to the card service managing unit. The card service managing unit, upon receiving the encryption message and serial number of the card sent from the calling user terminal, uses the random number to decrypt the received encryption message and then searches the database for the deposit corresponding to the serial number of the card and the password of the card. The password of the card is obtained via decryption.

Practically, the card service managing unit may further check the validity of the random number before decrypting, e.g., determine whether the random number is expired, or whether it is out of time, or whether it has been used. If the random number is determined to be invalid, the card service managing unit may reject a card call initiated by the calling user terminal, or send another random number to the calling user terminal.

It should be indicated that the serial number of the card may not be encrypted by the calling user terminal, i.e. the calling user terminal merely encrypts the password of the card to obtain the encryption message. The calling user terminal may not send the random number to the card service managing unit. If the random number is not sent to the card service managing unit, the validity of the random number is not required to be checked by the card service managing unit.

Block 260: The card service managing unit determines whether a card call may be supported according to the obtained card information, and performs Block 280 if a card call may be supported; otherwise performs Block 270 and terminates the process.

Here is a method for determining whether a card call may be supported according to the obtained card information. The card service managing unit may determine whether the deposit could be found according to the obtained serial number and password of the card, and if the deposit could not be found, the card service managing unit determines that a card call may not be supported according to the obtained card information. Practically, when the deposit is found by the card service managing unit according to the obtained serial number and password of the card, the card service managing unit may further determine whether the deposit is enough to support the subsequent communication. If the deposit is enough to support the subsequent communication, the card service managing unit determines that a card call is able to be supported according to the obtained card information; otherwise, determines that a card call is unable to be supported according to the obtained card information. For example, if a minimum communication unit set in the card service managing unit is one minute, and the deposit is not enough to support a one-minute communication, the card service managing unit may determine that the obtained card information is not able to support a card call.

In practical applications, whether a card call may be supported according to the obtained card information may further be determined by the card service managing unit by using the following method. That is, the card service managing unit searches the database for the password of the card corresponding to the received serial number of the card, encrypts the password of the card to obtain an encryption message, determines whether the encryption message obtained is identical with the encryption message sent from the calling user terminal. If the encryption message obtained is not identical with the encryption message sent from the calling user terminal, the card service managing unit determines that the card information obtained may not support a card call; otherwise, the card service managing unit determines that the card information obtained may support a card call.

Practically, if the user terminal and the card service managing unit employ a reversible encryption algorithm such as an Exclusive OR (XOR) encryption algorithm, the card service managing unit may decrypt the encryption message sent from the user terminal with a reversible encryption decryption algorithm directly to obtain the password of the card, then determine whether the obtained password of the card is identical with the password of the card corresponding to the card number which is saved in the database. If the obtained password is not identical with the password of the card corresponding to the card number which is saved in the database, the card service managing unit determines that a card call may not be supported according to the obtained card information. If the obtained password is identical with the password of the card corresponding to the card number which is saved in the database, the card service managing unit determines that a card call may be supported according to the obtained card information.

Generally, when the card is produced, the serial number and the password of the card are correspondingly saved in the database, so that the password of the card may be found according to the serial number of the card, and the serial number of the card may be found according to the password of the card.

Block 270: The card service managing unit rejects a card call initiated by the calling user terminal.

Block 280: The card service managing unit provides a card call service for the calling user terminal with a conventional method. To be specific, the method for providing the card call service generally includes the following processes. The card service managing unit sends the call request to the called user terminal according to the called information contained in the call request sent from the calling user terminal, and sets up, when the called user terminal accepts the call request, a media channel between the calling and called user terminals to support the subsequent communication between the calling user terminal and the called user terminal.

It can be seen from the processes shown in FIG. 2 that the method merely relates to obtaining card information of a user terminal and determining whether the card information may support communication, and not relates to authenticating the calling information. In such a case that the calling information is not authenticated, the card call service may also be provided for the user terminal.

Figure 3:
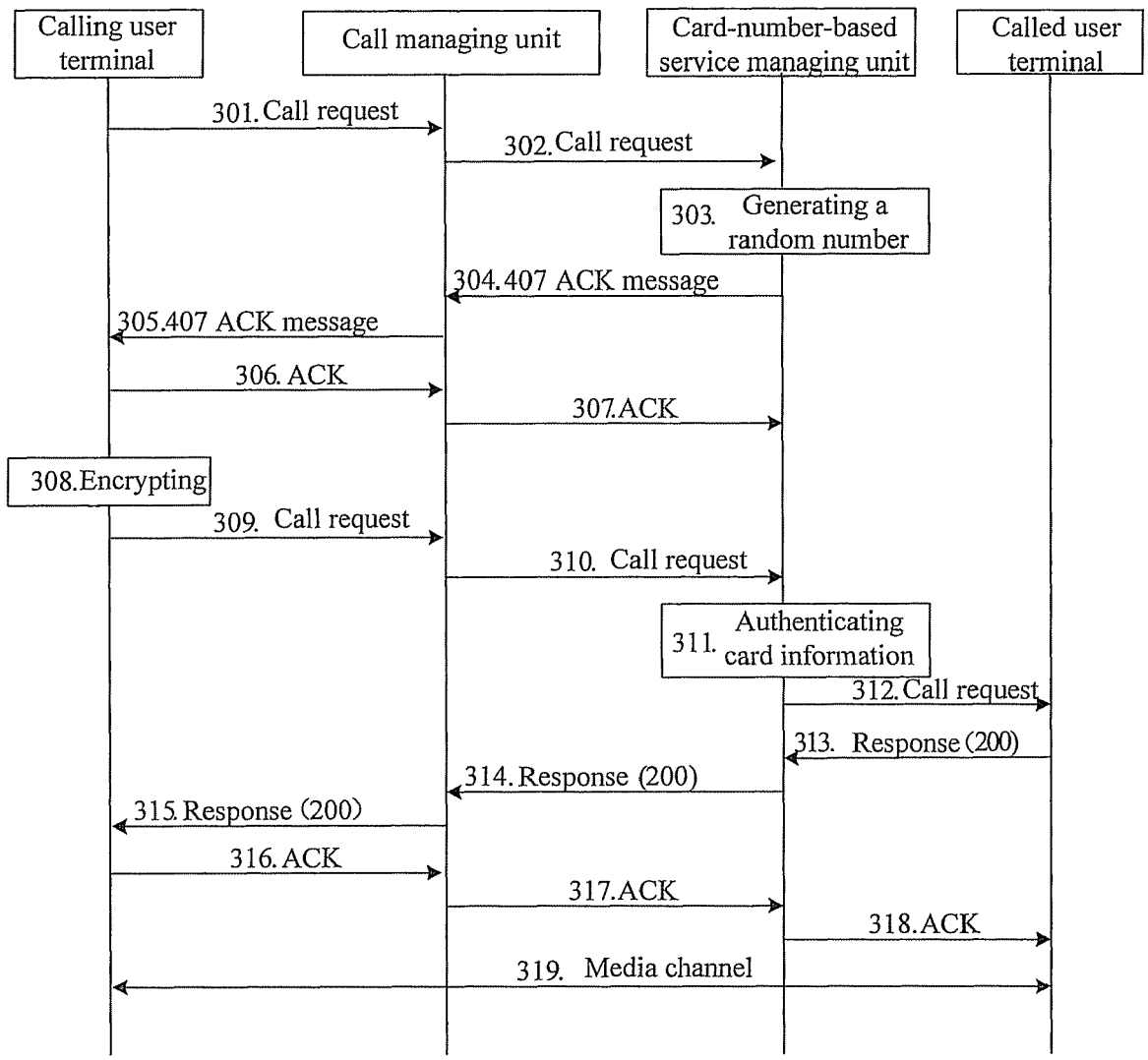
FIG. 3 is a simplified flow chart of a method for implementing a card call service according to another embodiment of the present invention.

FIG. 3 shows a simplified flow chart illustrating a method for implementing a card call service according to another embodiment of the present invention. The flow chart may clearly and fluently present the procedure for implementing the card call service. Key processes of implementing the card call service in FIG. 3 have been described in detail in FIG. 2, thus FIG. 3 is merely described concisely as follows.

The flow chart shown in FIG. 3 includes the following processes:

Process 301: A calling user terminal initiates a call by sending a call request to a call managing unit. The called user address field (i.e., the user part of the Request-URI) in the call request may be filled with a card call service identifier and the number of a called user, e.g., the card call service identifier corresponding to 17910 phone card call service and the number of the called number.

Process 302: The call managing unit determines, according to the call request sent from the calling user terminal, whether the call initiated by the calling user terminal is a card call, and forwards the call request to a card service managing unit if the call is determined to be a card call.

Process 303: The card service managing unit generates a random number upon receiving the call request.

Processes 304 and 305: The generated random number is configured into a message format by the card service managing unit and sent to the calling user terminal via the call managing unit, e.g., the random number is configured into the Proxy-Authentication of the 407 ACK message used for the Proxy Authentication Required.

Processes 306 and 307: The calling user terminal returns an ACK message to the card service managing unit via the call managing unit upon receiving the random number.

Process 308: The calling user terminal encrypts the serial number and the password of a card saved by itself with the random number sent from the card service managing unit.

Processes 309 and 310: The calling user terminal sends the encryption message obtained by encrypting, the serial number of the card and the random number carried in the call request to the card service managing unit. The call request contains Proxy-Authorization which is used for carrying the random number, the serial number of the card and the encryption message. The username field of the Proxy-Authorization is used for carrying the serial number of the card, the nonce field of the Proxy-Authorization is used for carrying the random number, and the response field of the Proxy-Authorization is used for carrying the encryption message.

It should be indicated that the serial number of the card may not be encrypted by the calling user terminal, i.e. the calling user terminal merely encrypts the password of the card to obtain the encryption message. The calling user terminal may not send the random number to the card service managing unit. If the random number is not sent to the card service managing unit, the validity of the random number is not required to be checked by the card service managing unit.

Practically, a method for filling in the serial number and password of the card may be designed according to practical applications or requirements of the service.

Process 311: The card service managing unit receives the random number, the serial number of the card and the encryption message sent from the calling user terminal, and authenticates the card information according to the received information, i.e., determines whether a card call is able to be supported according to the card information.

Process 312: The card service managing unit sends the call request received in Process 303 or Process 311 to the called user terminal if a card call is determined to be able to be supported according to the card information.

From Process 313 to Process 315: The called user terminal receives the call request and sends a 200 ACK message to the calling user terminal via the card service managing unit and the call managing unit.

From Process 316 to Process 318: The calling user terminal receives the 200 ACK message and sends an ACK message to the called user terminal via the card service managing unit and the call managing unit.

Process 319: The card service managing unit sets up a media channel which enables the calling terminal and called user terminal to carry out the subsequent communication upon receiving the 200 ACK message sent from the called user terminal or the ACK message sent from the calling user terminal.

In practical applications, the serial number and password of a card required when the calling user terminal sends the card information to the card service managing unit may either be entered manually by the user, or pre-stored in the calling user terminal and the calling user terminal makes use of the serial number and password of the card when needed. The above method of pre-storing the serial number and password of the card has merits of convenience and promptitude, and does not require an MRS participating in the receiving of the serial number and password of the card, thereby observably saving the transport resources, remarkably enhancing the speed of implementing a card call, and observably improving the satisfaction of users.

Furthermore, in the flow of implementing a card call shown in FIG. 2 and FIG. 3, the user terminal may be any NGN terminal and is capable of applying such communication protocols supported by NGN as the Session Initiation Protocol (SIP).

Furthermore, as logical entities, the call managing unit and the card service managing unit may either be set together in the same physical entity or set respectively in different physical entities. For example, the call managing unit is set in a call processing server such as a soft-switching device and the card service managing unit is set in a card call server.

Finally, it should be noted that the deposit is used in the process of determining whether a card call may be supported according to the card information described in FIG. 2 and FIG. 3. In practical applications, other contents of the card information, such as a long-distance call identifier or a local call identifier, are further involved besides the deposit or are merely involved in the process. The long-distance call identifier indicates that the card merely supports a long-distance call, and the local call identifier indicates that the card merely supports a local call. The deposit, the long-distance call identifier and the local call identifier, etc., are generally named as card call privilege information. It should be indicated that the card information includes the serial number and password of a card, and the card call privilege information.

Specifically, card call privilege information used in the process of determining whether a card call may be supported according to the card information may be different. Therefore, the corresponding determining methods may be different too.

When the card service managing unit obtains the card information of the user terminal, or when the card service managing unit determines that a card call may be supported according to the deposit after obtaining the card information, the card service managing unit may read the card call privilege information such as the long-distance call identifier or local call identifier carried in the card information, then determines whether the call corresponding to the call request is a long-distance call or a local call with a conventional method according to the called number carried in the call request sent from the user terminal. If the call corresponding to the call request is a long-distance call or a local call, the card service managing unit determines that the call request sent from the user terminal matches the card call privilege information obtained and further determines that the card information of the user terminal supports a card call, otherwise determines that a card call may not be supported according to the card information of the user terminal.

Practically, communicating entities such as the card service managing unit may establish and save the corresponding relation between the serial number of the card, the password of the card and the card call privilege information including the deposit of the card.

It can be seen from the above that the method for implementing the card call service provided by embodiments of the present invention NGN may provide a user terminal with a card call service as long as the user terminal initiating a card call which may be supported according to the card information, so that the satisfaction of the user may be observably improved.

The invention claimed is:

1. A method for implementing a card call service, comprising:
   obtaining card information of a user terminal when determining that a call initiated by the user terminal is a card call by
   (a) generating a random number and sending the random number to the user terminal;
   (b) receiving an encryption message obtained by encrypting a password of a card with the random number, a serial number of the card and the random number sent from the user terminal; and
   (c) decrypting the encryption message with the random number and searching a database for card call privilege information which corresponds to the password of the card obtained the serial number of the card;

providing a card call service for the user terminal when determining that the card call is supported according to the card information.

2. The method of claim 1, wherein the determining that a call initiated by the user terminal is a card call comprises:
reading calling information carried in a call request sent from the user terminal, and determining that the call initiated by the user terminal is a card call when the calling information is null or the calling information carries a card call service identifier indicating a card call.

3. The method of claim 1, wherein the determining that a call initiated by the user terminal is a card call comprises:
reading called information carried in a call request sent from the user terminal, and determining that the call initiated by the user terminal is a card call when the called information carries a card call service identifier indicating a card call.

4. The method of claim 1, wherein the determining that a call initiated by the user terminal is a card call comprises:
reading calling information and called information carried in a call request sent from the user terminal, and determining that the call initiated by the user terminal is a card call when the calling information is null or the calling information carries a card call service identifier indicating a card call, and when the called information carries the card call service identifier indicating a card call.

5. The method of claim 1, wherein the obtaining card information of a user terminal comprises:
reading a serial number and a password of a card carried in a call request sent from the user terminal and searching a database for card call privilege information corresponding to the serial number and the password of the card.

6. The method of claim 1, wherein the obtaining card information of a user terminal comprises:
sending a card information obtaining command to the user terminal;
receiving a serial number and a password of a card sent from the user terminal,
wherein the serial number and the password of the card are saved or received by the user terminal;
searching a database for card call privilege information corresponding to the serial number and password of the card.

7. The method of claim 1, wherein the sending the random number to the user terminal comprises:
carrying the random number in the Proxy-Authentication of 407 ACK message and sending the 407 ACK message to the user terminal.

8. The method of claim 1, wherein the determining that the card call is supported according to the card information comprises:
receiving an encryption message obtained by encrypting a password of a card by the user terminal adopting an encryption method, searching the corresponding password of the card according to a serial number of the card carried in the card information, encrypting the password of the card with the encryption method which is identical with the encryption method adopted by the user terminal and obtaining an encryption message, and determining, according to the card information sent from the user terminal, that the card call is supported when the encryption message obtained is identical with the encryption message sent from the user terminal.

9. The method of claim 1, wherein the determining that the card call is supported according to the card information comprises:
receiving an encryption message obtained by encrypting a password of a card by the user terminal with a reversible encryption algorithm, searching the corresponding password of the card based on a serial number of the card carried in the card information, decrypting the encryption message with a reversible decrypting algorithm and obtaining a decrypted password of the card, and determining, according to the card information, that the card call is supported when the decrypted password of the card is identical with the corresponding password of the card.

10. The method of claim 1, wherein the determining that the card call is supported according to the card information comprises:
reading a long-distance call identifier or a local call identifier carried in the card information obtained, and determining, according to the card information, that the card call is supported when the call initiated by the user terminal is determined to be a long-distance call or a local call according to the called information sent from the user terminal.

11. The method of claim 1, wherein the determining that the card call is supported according to the card information comprises:
obtaining card call privilege information according to a serial number and a password of a card carried in the card information obtained, and determining, according to the card information obtained, that the card call is supported when subsequent communication is determined to be supported according to the card call privilege information.

12. The method of claim 11, wherein the card call privilege information is a deposit of the card.

13. An apparatus for implementing a card call service, comprising:
a call managing unit, configured to receive a call initiated by a user terminal, and send the call to a card call service managing unit when the call is determined to be a card call;
the card call service managing unit, configured to obtain card information of the user terminal and provide a card call service for the user terminal when the card call is determined to be supported according the card information;
wherein the card information of the user terminal is obtained by
(a) generating a random number, and sending the random number to the user terminal;
(b) receiving an encryption message obtained by encrypting a password of a card with the random number, a serial number of the card and the random number sent from the user terminal; and
(c) decrypting the encryption message with the random number and searching a database for card call privilege information which corresponds to the password of the card obtained by the decrypting and the serial number of the card.

14. The apparatus of claim 13, wherein the card call service managing unit is configured to receive an encryption message obtained by encrypting a password of a card by the user terminal adopting an encryption method, search the corresponding password of the card according to a serial number of the card carried in the card information, encrypt the password of the card with the encryption method which is identical with the encryption method adopted by the user terminal and obtain an encryption message, and determine, according to the card information sent from the user terminal, that the card call is supported when the encryption message obtained is identical with the encryption message sent from the user terminal.

15. The apparatus of claim 13, wherein the card call service managing unit is configured to receive an encryption message obtained by encrypting a password of a card by the user terminal with a reversible encryption algorithm, search the corresponding password of the card based on a serial number of the card carried in the card information, decrypt the encryption message with a reversible decrypting algorithm and obtain a decrypted password of the card, and determine, according to the card information, that the card call is supported when the decrypted password of the card is identical with the searched password of the card.

16. The apparatus of claim 13, wherein the card call service managing unit is configured to read a long-distance call identifier or a local call identifier carried in the card information obtained, and determine, according to the card information, that the card call is supported when the call initiated by the user terminal is determined to be a long-distance call or a local call according to the called information sent from the user terminal.

17. The apparatus of claim 13, wherein
the card call service managing unit is configured to obtain card call privilege information according to a serial number and a password of a card carried in the card information obtained, and determine, according to the card information obtained, that the card call is supported when subsequent communication is determined to be supported according to card call privilege information.

18. A method for implementing a card call service, comprising:
obtaining card information of a user terminal when determining that a call initiated by the user terminal is a card call; and
providing a card call service for the user terminal when determining that the card call is supported according to the card information;
wherein the obtaining card information of a user terminal comprises:
generating a random number and sending the random number to the user terminal;
receiving an encryption message obtained by encrypting a password of a card with the random number and a serial number of the card sent from the user terminal; and
decrypting the encryption message with the random number and searching a database for card call privilege information which corresponds to the password of the card obtained by the decrypting and the serial number of the card.

19. An apparatus for implementing a card call service, comprising:
a call managing unit, configured to receive a call initiated by a user terminal, and send the call to a card call service managing unit when the call is determined to be a card call; and
the card call service managing unit, configured to obtain card information of the user terminal and provide a card call service for the user terminal when the card call is determined to be supported according the card information;
wherein the card information of the user terminal is obtained by
(a) generating a random number and sending the random number to the user terminal;
(b) receiving an encryption message obtained by encrypting a password of a card with the random number, and a serial number of the card sent from the user terminal; and
(c) decrypting the encryption message with the random number and searching a database for card call privilege information which corresponds to the password of the card obtained by the decrypting and the serial number of the card.

* * * * *

UNITED STATES PATENT AND TRADEMARK OFFICE
CERTIFICATE OF CORRECTION

| | | |
|---|---|---|
| PATENT NO. | : 7,940,902 B2 | Page 1 of 1 |
| APPLICATION NO. | : 11/871617 | |
| DATED | : May 10, 2011 | |
| INVENTOR(S) | : Peng Wang | |

It is certified that error appears in the above-identified patent and that said Letters Patent is hereby corrected as shown below:

Column 8, line 67, after the word "obtained," please insert the words -- by the decrypting and --.

Signed and Sealed this
Twelfth Day of July, 2011

David J. Kappos
*Director of the United States Patent and Trademark Office*